United States Patent
Rao et al.

(10) Patent No.: US 10,363,550 B2
(45) Date of Patent: Jul. 30, 2019

(54) MESOPOROUS MATERIAL-COATED COBALT-BASED CATALYST FOR FISCHER-TROPSCH SYNTHESIS AND METHOD FOR PREPARING THE SAME

(71) Applicant: WUHAN KAIDI ENGINEERING TECHNOLOGY RESEARCH INSTITUTE CO., LTD., Wuhan (CN)

(72) Inventors: Shasha Rao, Wuhan (CN); Dechen Song, Wuhan (CN); Qianqian Liu, Wuhan (CN); Shenke Zheng, Wuhan (CN)

(73) Assignee: WUHAN KAIDI ENGINEERING TECHNOLOGY RESEARCH INSTITUTE CO., LTD., Wuhan (CN)

(*) Notice: Subject to any disclaimer, the term of this patent is extended or adjusted under 35 U.S.C. 154(b) by 0 days.

(21) Appl. No.: 15/331,925

(22) Filed: Oct. 24, 2016

(65) Prior Publication Data
US 2017/0036198 A1    Feb. 9, 2017

Related U.S. Application Data

(63) Continuation-in-part of application No. PCT/CN2015/072402, filed on Feb. 6, 2015.

(30) Foreign Application Priority Data

Apr. 22, 2014  (CN) .......................... 2014 1 0162615

(51) Int. Cl.
*B01J 21/08* (2006.01)
*B01J 23/75* (2006.01)
(Continued)

(52) U.S. Cl.
CPC .......... *B01J 31/0274* (2013.01); *B01J 21/08* (2013.01); *B01J 23/75* (2013.01); *B01J 33/00* (2013.01);
(Continued)

(58) Field of Classification Search
CPC ........ B01J 21/08; B01J 23/75; B01J 31/0274; B01J 33/00; B01J 37/0244
See application file for complete search history.

(56) References Cited

U.S. PATENT DOCUMENTS 8,889,582 B2 * 11/2014 Noguchi ............... B01J 21/08
                                                502/158
9,309,166 B2 *  4/2016 Visagie ............... B01J 37/0205
(Continued)

FOREIGN PATENT DOCUMENTS

| GB | 2415396 A | * 12/2005 | ............. B01J 23/75 |
| JP | WO 2011077974 A1 | *  6/2011 | ............. C01B 33/12 |
| WO | WO 2012163969 A1 | * 12/2012 | ............. B01J 23/75 |

*Primary Examiner* — Jun Li
(74) *Attorney, Agent, or Firm* — Matthias Scholl P.C.; Matthias Scholl (57) ABSTRACT

A catalyst including cobalt, a carrier including silica, and a selective promoter including zirconium. The cobalt and the selective promoter are disposed on the surface of the carrier, and the outer surfaces of the active component cobalt and the selective promoter zirconium are coated with a shell layer including a mesoporous material. A method for preparing the catalyst, including: 1) soaking the carrier including silica into an aqueous solution including a zirconium salt, aging, drying, and calcining a resulting mixture to yield a zirconium-loaded carrier including silica; 2) soaking the zirconium-loaded carrier including silica into an aqueous solution including a cobalt salt, aging, drying, calcining a resulting mixture to yield a primary cobalt-based catalyst; 3) preparing a precursor solution of a mesoporous material; and 4) soaking the primary cobalt-based catalyst into the precursor solution of the mesoporous material; and crystallizing, washing, drying, and calcining a resulting mixture.

14 Claims, 4 Drawing Sheets

(51) Int. Cl.

| | |
|---|---|
| *B01J 21/06* | (2006.01) |
| *B01J 31/02* | (2006.01) |
| *B01J 33/00* | (2006.01) |
| *B01J 35/10* | (2006.01) |
| *C10G 2/00* | (2006.01) |
| *B01J 35/00* | (2006.01) |
| *B01J 35/02* | (2006.01) |
| *B01J 37/00* | (2006.01) |
| *B01J 37/02* | (2006.01) |
| *B01J 37/08* | (2006.01) |

(52) U.S. Cl.
CPC ....... *B01J 35/0006* (2013.01); *B01J 35/0013* (2013.01); *B01J 35/026* (2013.01); *B01J 35/10* (2013.01); *B01J 35/1019* (2013.01); *B01J 35/1042* (2013.01); *B01J 35/1047* (2013.01); *B01J 35/1061* (2013.01); *B01J 37/0018* (2013.01); *B01J 37/0244* (2013.01); *B01J 37/088* (2013.01); *C10G 2/00* (2013.01)

(56) References Cited

U.S. PATENT DOCUMENTS

| | | | |
|---|---|---|---|
| 2005/0181202 A1* | 8/2005 | Fujii et al. | B32B 5/16 428/403 |
| 2009/0053524 A1* | 2/2009 | Yamada | B01J 20/103 428/404 |
| 2010/0056366 A1* | 3/2010 | Lee | B01J 21/063 502/300 |
| 2012/0115715 A1* | 5/2012 | Wolters | B01J 23/72 502/240 |
| 2012/0264599 A1* | 10/2012 | Komatsu | C01B 33/12 502/401 |
| 2014/0087936 A1* | 3/2014 | Calderone | B01J 23/75 502/8 |

\* cited by examiner

MESOPOROUS MATERIAL-COATED COBALT-BASED CATALYST FOR FISCHER-TROPSCH SYNTHESIS AND METHOD FOR PREPARING THE SAME

CROSS-REFERENCE TO RELATED APPLICATIONS

This application is a continuation-in-part of International Patent Application No. PCT/CN2015/072402 with an international filing date of Feb. 6, 2015, designating the United States, now pending, and further claims foreign priority benefits to Chinese Patent Application No. 201410162615.4 filed Apr. 22, 2014. The contents of all of the aforementioned applications, including any intervening amendments thereto, are incorporated herein by reference.

BACKGROUND OF THE INVENTION

Field of the Invention

The invention relates to a mesoporous material-coated cobalt-based catalyst for Fischer-Tropsch synthesis and a method for preparing the same.

Description of the Related Art

Fischer-Tropsch synthesis involves complex catalytic reactions. However, conventional catalysts have poor stability and poor water compatibility. In addition, conventional Fischer-Tropsch catalysts are complex and costly to prepare.

SUMMARY OF THE INVENTION

In view of the above-described problems, it is one objective of the invention to provide improved catalyst for Fischer-Tropsch synthesis and a method for preparing the same.

To achieve the above objective, in accordance with one embodiment of the invention, there is provided a mesoporous material-coated cobalt-based catalyst for Fischer-Tropsch synthesis. The catalyst comprises cobalt, a carrier comprising silica, and a selective promoter comprising zirconium. The cobalt and the selective promoter comprising zirconium are disposed on a surface of the carrier comprising silica, and the outer surfaces of the active component cobalt and the selective promoter zirconium are coated with a shell layer comprising a mesoporous material.

The catalyst of certain embodiments of the present disclosure is prepared by first loading the active component on the surface of the carrier comprising silica by soaking, and coating the mesoporous material possessing regular pore channels outside the active component, during which, a thickness of the shell layer comprising the mesoporous material is controllable by changing parameters. The thickness of the shell layer comprising the mesoporous material is designed to be between 1.8 and 13 μm, and preferably between 2.0 and 6.0 μm. Thus, the shell layer comprising the mesoporous material encapsulates the active component inside the pore channels to avoid the aggregation and shedding of the active component, and in the meanwhile, the regular pore channel of the mesoporous material provides mass transfer channel for CO and $H_2$ to ensure the high reactivity of the catalyst.

In a class of this embodiment, to avoid the decrease in the activity of the catalyst because of the shedding of the active component in the reaction process or the transfer process, and to prevent the active metal cobalt from being oxidized and deactivated by water produced in the reaction, the shell layer comprising the mesoporous material is coated with a hydrophobic organic layer.

In a class of this embodiment, the carrier comprising silica is an inorganic silica gel.

In a class of this embodiment, the inorganic silica gel has a specific area of between 150 and 350 $m^2/g$, an average pore size of between 3 and 50 nm, a pore volume of between 0.7 and 1.7 mL/g, and a particle size of between 20 and 200 μm.

In a class of this embodiment, the specific area of the inorganic silica gel is between 200 and 300 $m^2/g$, the average pore size of the inorganic silica gel is between 8 and 13 nm, the pore volume of the inorganic silica gel is between 0.75 and 1.3 mL/g, and the particle size of the of the inorganic silica gel is between 40 and 150 μm.

In a class of this embodiment, a content of the active component cobalt accounts for between 10 and 25 wt. % of a total weight of the catalyst; and a content of the selective promoter zirconium accounts for between 5 and 10 wt. % of the total weight of the catalyst.

In a class of this embodiment, the content of the active component cobalt accounts for between 15 and 20 wt. % of the total weight of the catalyst; and the content of the selective promoter zirconium accounts for between 5 and 8 wt. % of the total weight of the catalyst.

In a class of this embodiment, the content of the active component cobalt accounts for between 20 and 25 wt. % of the total weight of the catalyst; and the content of the selective promoter zirconium accounts for between 8 and 10 wt. % of the total weight of the catalyst.

In a class of this embodiment, the catalyst has a specific area of between 150 and 400 $m^2/g$, an average pore size of between 2 and 40 nm, and a pore volume of between 0.5 and 1.4 mL/g.

In a class of this embodiment, the catalyst has the specific area of between 250 and 350 $m^2/g$, the average pore size of between 3 and 9 nm, and the pore volume of between 0.6 and 1.0 mL/g.

In accordance with another embodiment of the invention, there is provided a method for preparing the above catalyst. The method comprises:

1) soaking the carrier comprising silica into an aqueous solution comprising a zirconium salt, aging a resulting first mixture for between 12 and 24 hrs, drying the first mixture at a temperature of between 70 and 120° C. for between 8 and 24 hrs, calcining the first mixture at a temperature of between 400 and 500° C. for between 3 and 12 hrs to yield a zirconium-loaded carrier comprising silica;

2) soaking the zirconium-loaded carrier comprising silica into an aqueous solution comprising a cobalt salt, aging a resulting second mixture for between 12 and 24 hrs, drying the second mixture at a temperature of between 70 and 120° C. for between 8 and 24 hrs, calcining the second mixture at a temperature of between 400 and 500° C. for between 3 and 12 hrs to yield a primary cobalt-based catalyst for Fischer-Tropsch synthesis;

3) dissolving a template agent P123 into a nitric acid solution, uniformly stirring a resulting third mixture, adding tetraethyl orthosilicate to the third mixture and continuing stirring for between 12 and 30 hrs to yield a precursor solution of a mesoporous material; and 4) soaking the primary cobalt-based catalyst for Fischer-Tropsch synthesis into the precursor solution of the mesoporous material to yield a fourth mixture; and crystalizing, washing, drying, and calcining the fourth mixture to yield the mesoporous material-coated cobalt-based catalyst for Fischer-Tropsch synthesis.

In a class of this embodiment, the method further comprises: 5) soaking the mesoporous material-coated cobalt-based catalyst for Fischer-Tropsch synthesis into a hydrophobic organic solution, sealing a resulting fifth mixture for between 3 and 12 hrs, and selecting an organic solvent to rinse the fifth mixture, drying the fifth mixture at a temperature of between 60 and 90° C. for between 3 and 8 hrs to yield a mesoporous material-coated cobalt-based catalyst possessing hydrophobic property.

In a class of this embodiment, the zirconium salt of 1) is zirconium nitrate or zirconyl nitrate, and preferably zirconyl nitrate.

In a class of this embodiment, the cobalt salt of 2) is cobalt carbonate or cobalt nitrate, and preferably cobalt nitrate.

In a class of this embodiment, in 3), a concentration of the nitric acid solution is between 1 and 2 mol/L; the third mixture is stirred at a temperature of between 25 and 45° C. until a clarified solution is yielded. Tetraethyl orthosilicate is added to the clarified solution and continued stirring for between 12 and 24 hrs to yield the precursor solution of the mesoporous material.

The template agent P123 adopts a known triblock copolymer, i.e., polyoxyethylene-polyoxypropylene-polyoxyethylene, having a molecular formula of PEO-PPO-PEO and a general formula of $EO_{20}PO_{70}EO_{20}$.

In a class of this embodiment, in 4), the crystalizing is performed at a temperature of between 80 and 130° C. for between 20 and 100 hrs at a rotational speed of between 7 and 20 rpm. The washing is performed using deionized water until the fourth mixture is neutral. The drying is performed at a temperature of between 80 and 120° C. for between 10 and 20 hrs. The calcining is performed at a temperature of between 400 and 550° C. for between 5 and 12 hrs.

In a class of this embodiment, in 4), the crystalizing is performed at the temperature of between 90 and 120° C. for between 30 and 80 hrs at a rotational speed of between 7 and 15 rpm.

In a class of this embodiment, in 5), the hydrophobic organic solution is one selected from the group consisting of a polymethyltriethoxysilane, γ-aminopropyltriethoxysilane, and trimethylchlorosilane.

In a class of this embodiment, in 5), the hydrophobic organic solution is one selected from the group consisting of n-hexane, acetone, and ethanol.

In a class of this embodiment, in 5), the mesoporous material-coated cobalt-based catalyst for Fischer-Tropsch synthesis is soaked in the hydrophobic organic solution and sealed for between 3 and 8 hrs, and then rinsed by the organic solvent for between 2 and 3 times.

Advantages of the mesoporous material-coated cobalt-based catalyst for Fischer-Tropsch synthesis and the method for preparing the same according to embodiments of the invention are summarized as follows:

The cobalt-based catalyst for the Fischer-Tropsch synthesis prepared in the invention overcomes the limitation of the conventional cobalt-based catalyst and the eggshell type catalyst. By first coating the shell layer comprising the mesoporous material on the surface of the catalyst and controlling the thickness of the shell layer by process parameters, the active component of the catalyst is protected, and in the meanwhile the structure of the pore channels of the mesoporous material provides the channels for diffusion of CO and $H_2$. Furthermore, the introduction of the superhydrophobic organic molecules into the shell layer comprising the mesoporous material is able to effectively stop the water molecules from inside the channels.

Not only is the shedding of the active component prevented during the friction, activation, or transfer process of the catalyst, but also the influence of the vapor on the catalyst is avoided in the reaction. Thus, the stability of the catalyst is greatly improved, and the service life of the catalyst is effectively prolonged. The cobalt-based catalyst of certain embodiments of the present disclosure possesses long service life, high reactivity, good stability, high selectivity of liquid hydrocarbon ($C_{5+}$), and low selectivity of methane, and is therefore particularly adaptable to bubble column slurry reactor or continuous stirred slurry reactor.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a mesoporous material-coated cobalt-based catalyst for Fischer-Tropsch synthesis are described below. It should be noted that the following examples are intended to describe and not to limit the invention.

Example 1 Preparation of Catalyst B

The catalyst B comprises: an inorganic silica gel as a carrier, cobalt as an active component, zirconium as a promoter, and a shell layer comprising a mesoporous material. A content of zirconium is 5 wt. %, and a content of cobalt is 20 wt. %.

Preparation of the catalyst B is as follows:

1) 30 g of the inorganic silica gel carrier having a specific area of 280 $m^2/g$, a pore volume of 1.25 mL/g, an average pore size of 13.6 nm, and a particle size of 40 μm was soaked in 45 mL of an aqueous solution comprising 5.07 g of $ZrO(NO_3)_2$ to yield a first mixture. The first mixture was then aged in air for 16 hrs, dried at 110° C. for 8 hrs, and calcined in a muffle furnace at 450° C. for 10 hrs to yield a zirconium-loaded inorganic silica gel carrier.

2) The zirconium-loaded inorganic silica gel carrier was soaked in 63 mL of an aqueous solution comprising 39.43 g of $Co(NO_3)_3 \cdot 6H_2O$ to yield a second mixture. Thereafter, the second mixture was aged in air for 16 hrs, dried at 110° C. for 8 hrs, and calcined in the muffle furnace at 450° C. for 10 hrs to yield a primary cobalt-based catalyst for Fischer-Tropsch synthesis.

3) 4 g of a template agent P123 is dissolved into 140 mL of a nitric acid solution having a concentration of 2 mol/L to yield a third mixture. The third mixture was thereafter stirred at 35° C. until a clarified solution was yielded. 8.4 g of tetraethyl orthosilicate was added to the clarified solution and continued stirring for 24 hrs to yield a precursor solution of a mesoporous material.

4) The precursor solution of the mesoporous material was transferred to a clean teflon reactor. 10 g of the primary cobalt-based catalyst for Fischer-Tropsch synthesis was soaked in the precursor solution of the mesoporous material to yield a fourth mixture. The fourth mixture was then fixed in a device for hydrothermal synthesis, crystalized at 130° C. for 20 hrs at a rotational speed of 7 rpm. The fourth mixture was then washed by deionized water to be neutral, dried at 100° C. for 12 hrs, and calcined at 550° C. for 5 hrs to yield the catalyst B, i.e., a mesoporous material-coated cobalt-based catalyst for Fischer-Tropsch synthesis.

Figure 1:
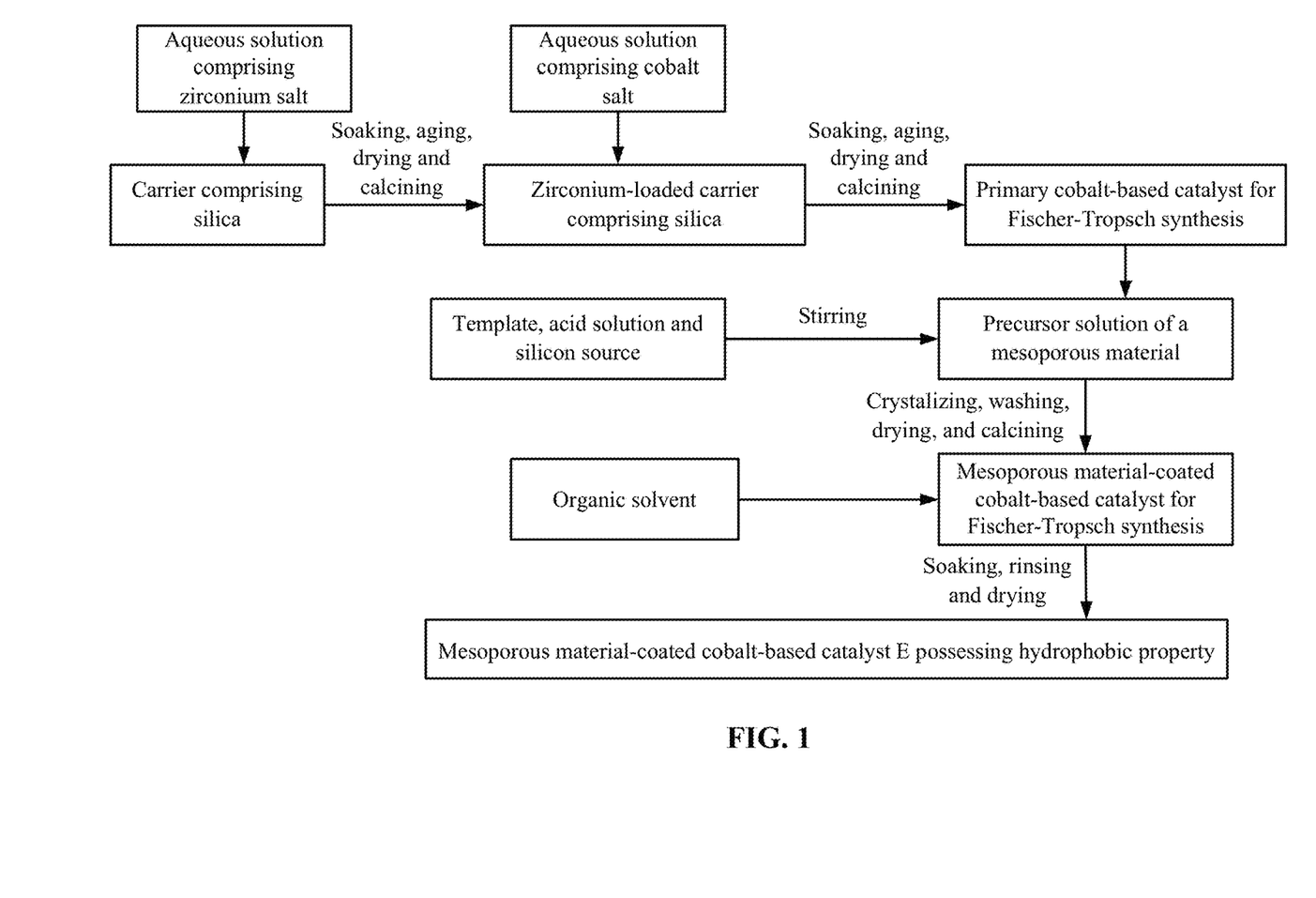
FIG. 1 is a flow chart showing a method for preparing a mesoporous material-coated cobalt-based catalyst for Fischer-Tropsch synthesis in accordance with one embodiment of the invention.
Figure 2:
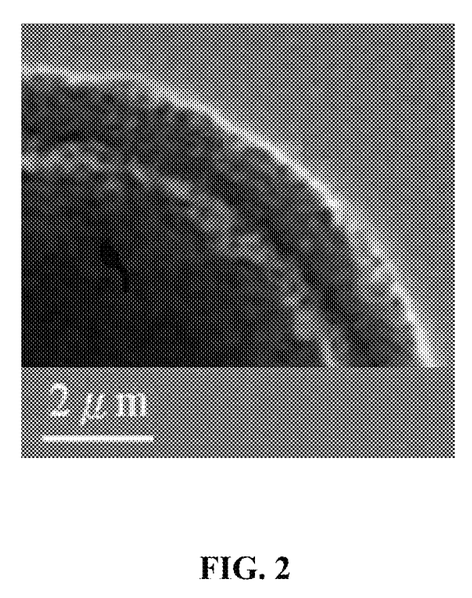
FIG. 2 is a TEM picture showing a thickness of a shell layer of a catalyst B in accordance with one embodiment of the invention.

It was found from detection that the catalyst B has a specific area of 291 $m^2/g$, a pore volume of 1.16 mL/g, an average pore size of 10.6 nm, and a thickness of the shell layer of 1.8 μm. The thickness of the shell layer of the catalyst B was illustrated in a TEM picture as shown in FIG. 2.

Example 2 Preparation of Catalyst C

The catalyst C comprises: an inorganic silica gel as a carrier, cobalt as an active component, zirconium as a promoter, and the shell layer comprising the mesoporous material as illustrated in Example 1. A content of zirconium is 5 wt. %, and a content of cobalt is 20 wt. %.

The preparation of the catalyst C is basically the same as that of Example 1 except that the time for the crystallization in 3) herein was 60 hrs.

Figure 3:
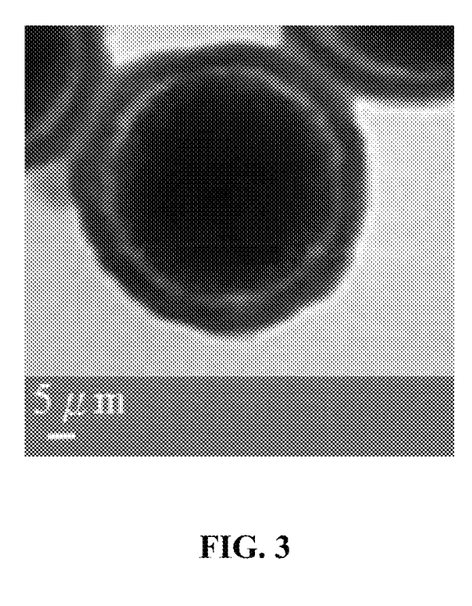
FIG. 3 is a TEM picture showing a thickness of a shell layer of a catalyst C in accordance with one embodiment of the invention.

It was found from detection that the catalyst C has a specific area of 301 $m^2/g$, a pore volume of 0.98 mL/g, an average pore size of 9.5 nm, and a thickness of the shell layer of 5 μm. The thickness of the shell layer of the catalyst C was illustrated in a TEM picture as shown in FIG. 3.

Example 3 Preparation of Catalyst D

The catalyst D comprises: an inorganic silica gel as a carrier, cobalt as an active component, zirconium as a promoter, and the shell layer comprising the mesoporous material as illustrated in Example 1. A content of zirconium is 5 wt. %, and a content of cobalt is 20 wt. %. The catalyst D has a specific area of 320 $m^2/g$, a pore volume of 1.02 mL/g, an average pore size of 8.9 nm, and a thickness of the shell layer of 13 μm.

Figure 4:
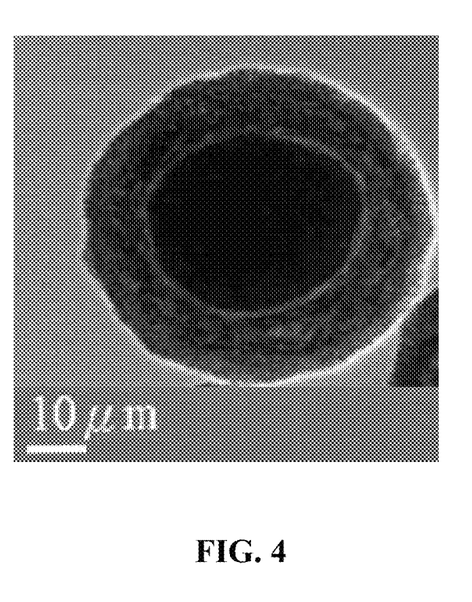
FIG. 4 is a TEM picture showing a thickness of a shell layer of a catalyst D in accordance with one embodiment of the invention.

The preparation of the catalyst D is basically the same as that of Example 1 except that the time for the crystallization in 3) herein was 100 hrs. The thickness of the shell layer of the catalyst D was illustrated in a TEM picture as shown in FIG. 4.

Example 4 Preparation of Catalyst E

The catalyst E comprises: an inorganic silica gel as a carrier, cobalt as an active component, zirconium as a promoter, a shell layer comprising a mesoporous material, and a hydrophobic organic compound layer of trimethylchlorosilane. A content of zirconium is 5 wt. %, and a content of cobalt is 20 wt. %.

Preparation of the catalyst E is as follows:

1) 30 g of the inorganic silica gel carrier having a specific area of 280 $m^2/g$, a pore volume of 1.25 mL/g, an average pore size of 13.6 nm, and a particle size of 40 μm was soaked in 45 mL of an aqueous solution comprising 5.07 g of $ZrO(NO_3)_2$ to yield a first mixture. The first mixture was then aged in air for 16 hrs, dried at 110° C. for 8 hrs, and calcined in a muffle furnace at 450° C. for 10 hrs to yield a zirconium-loaded inorganic silica gel carrier.

2) The zirconium-loaded inorganic silica gel carrier was soaked in 63 mL of an aqueous solution comprising 39.43 g of $Co(NO_3)_3 \cdot 6H_2O$ to yield a second mixture. Thereafter, the second mixture was aged in air for 16 hrs, dried at 110° C. for 8 hrs, and calcined in the muffle furnace at 450° C. for 10 hrs to yield a primary cobalt-based catalyst for Fischer-Tropsch synthesis.

3) 4 g of a template agent P123 is dissolved into 140 mL of a nitric acid solution having a concentration of 2 mol/L to yield a third mixture. The third mixture was thereafter stirred at 35° C. until a clarified solution was yielded. 8.4 g of tetraethyl orthosilicate was added to the clarified solution and continued stirring for 24 hrs to yield a precursor solution of a mesoporous material.

4) The precursor solution of the mesoporous material was transferred to a clean teflon reactor. 10 g of the primary cobalt-based catalyst for Fischer-Tropsch synthesis was soaked in the precursor solution of the mesoporous material to yield a fourth mixture. The fourth mixture was then fixed in a device for hydrothermal synthesis, crystalized at 130° C. for 20 hrs at a rotational speed of 7 rpm. The fourth mixture was then washed by deionized water to be neutral, dried at 100° C. for 12 hrs, and calcined at 550° C. for 5 hrs to yield a mesoporous material-coated cobalt-based catalyst for Fischer-Tropsch synthesis.

5) The mesoporous material-coated cobalt-based catalyst for Fischer-Tropsch synthesis was soaked in 200 mL of a trimethylchlorosilane solution, and sealed for 8 hrs. A resulting fifth mixture was then rinsed by anhydrous ethanol for 2 times, and dried at 80° C. for 8 hrs to yield the catalyst E, i.e., a mesoporous material-coated cobalt-based catalyst possessing hydrophobic property.

Figure 5:
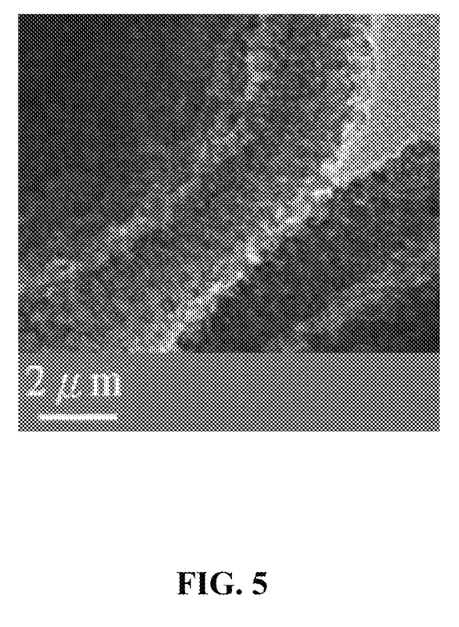
FIG. 5 is a TEM picture showing a thickness of a shell layer of a catalyst E in accordance with one embodiment of the invention.

It was found from detection that the catalyst E has a specific area of 279 $m^2/g$, a pore volume of 0.86 mL/g, an average pore size of 8.2 nm, and a thickness of the shell layer of 2.5 μm. The thickness of the shell layer of the catalyst E was illustrated in a TEM picture as shown in FIG. 5.

Example 5 Preparation of Catalyst F

The catalyst F comprises: an inorganic silica gel as a carrier, cobalt as an active component, zirconium as a promoter, and a shell layer comprising the mesoporous material, and a hydrophobic organic compound layer comprising polymethyltriethoxysilane. A content of zirconium is 5 wt. %, and a content of cobalt is 20 wt. %.

The preparation of the catalyst F is basically the same as that of Example 4 except that the polymethyltriethoxysilane is adopted to substitute trimethylchlorosilane of Example 4 as the material for the hydrophobic organic compound layer.

Figure 6:
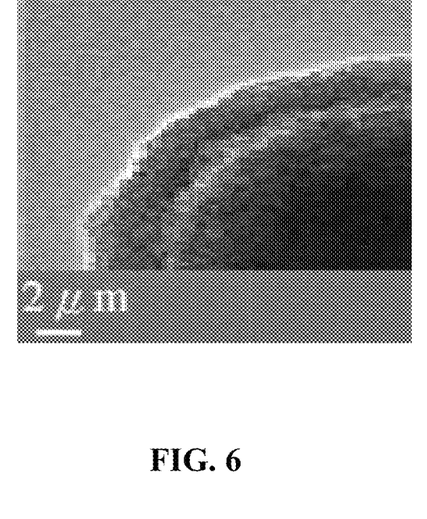
FIG. 6 is a TEM picture showing a thickness of a shell layer of a catalyst F in accordance with one embodiment of the invention.

It was found from detection that the catalyst F has a specific area of 282 $m^2/g$, a pore volume of 0.91 mL/g, an average pore size of 7.9 nm, and a thickness of the shell layer of 2.1 μm. The thickness of the shell layer of the catalyst F was illustrated in a TEM picture as shown in FIG. 6.

Example 6 Preparation of Catalyst G

The catalyst G comprises: an inorganic silica gel as a carrier, cobalt as an active component, zirconium as a promoter, and a shell layer comprising the mesoporous material, and a hydrophobic organic compound layer of γ-aminopropyltriethoxysilane. A content of zirconium is 5 wt. %, and a content of cobalt is 20 wt. %.

The preparation of the catalyst G is basically the same as that of Example 4 except that γ-aminopropyltriethoxysilane is adopted to substitute trimethylchlorosilane of Example 4 as the material for the hydrophobic organic compound layer.

Figure 7:
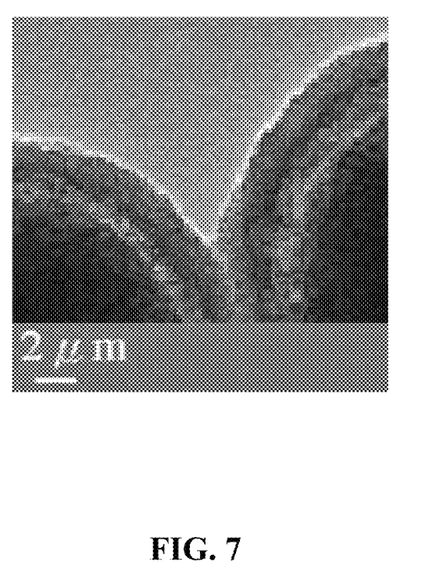
FIG. 7 is a TEM picture showing a thickness of a shell layer of a catalyst G in accordance with one embodiment of the invention.

It was found from detection that the catalyst G has a specific area of 280 $m^2/g$, a pore volume of 0.83 mL/g, an average pore size of 8.5 nm, and a thickness of the shell layer of 2.3 μm. The thickness of the shell layer of the catalyst G was illustrated in a TEM picture as shown in FIG. 7.

Example 7 Preparation of Catalyst H

The catalyst H comprises: an inorganic silica gel as a carrier, cobalt as an active component, zirconium as a promoter, a shell layer comprising a mesoporous material, and a hydrophobic organic compound layer of γ-aminopropyltriethoxysilane. A content of zirconium is 8 wt. %, and a content of cobalt is 25 wt. %.

Preparation of the catalyst H is as follows:

1) 30 g of the inorganic silica gel carrier having a specific area of 150 $m^2/g$, a pore volume of 1.3 mL/g, an average pore size of 8 nm, and a particle size of 90 μm was soaked in 45 mL of an aqueous solution comprising 16.74 g of $Zr(NO_3)_4 \cdot 5H_2O$ to yield a first mixture. The first mixture was then aged in air for 24 hrs, dried at 120° C. for 10 hrs, and calcined in a muffle furnace at 500° C. for 3 hrs to yield a zirconium-loaded inorganic silica gel carrier.

2) The zirconium-loaded inorganic silica gel carrier was soaked in 63 mL of an aqueous solution comprising 22.5 g of $CoCO_3$ to yield a second mixture. Thereafter, the second mixture was aged in air for 24 hrs, dried at 120° C. for 10 hrs, and calcined in the muffle furnace at 500° C. for 3 hrs to yield a primary cobalt-based catalyst for Fischer-Tropsch synthesis.

3) 4 g of a template agent P123 is dissolved into 140 mL of a nitric acid solution having a concentration of 1 mol/L to yield a third mixture. The third mixture was thereafter stirred at 45° C. until a clarified solution was yielded. 8.4 g of tetraethyl orthosilicate was added to the clarified solution and continued stirring for 12 hrs to yield a precursor solution of a mesoporous material.

4) The precursor solution of the mesoporous material was transferred to a clean teflon reactor. 10 g of the primary cobalt-based catalyst for Fischer-Tropsch synthesis was soaked in the precursor solution of the mesoporous material to yield a fourth mixture. The fourth mixture was then fixed in a device for hydrothermal synthesis, crystalized at 100° C. for 24 hrs at a rotational speed of 10 rpm. The fourth mixture was then washed by deionized water to be neutral, dried at 80° C. for 20 hrs, and calcined at 400° C. for 12 hrs to yield a mesoporous material-coated cobalt-based catalyst for Fischer-Tropsch synthesis.

5) The mesoporous material-coated cobalt-based catalyst for Fischer-Tropsch synthesis was soaked in 200 mL of a γ-aminopropyltriethoxysilane solution, and sealed for 3 hrs. A resulting fifth mixture was then rinsed by n-hexane for 3 times, dried at 60° C. for 3 hrs to yield the catalyst H, i.e., a mesoporous material-coated cobalt-based catalyst possessing hydrophobic property.

It was found from detection that the catalyst H has a specific area of 200 $m^2/g$, a pore volume of 1.0 mL/g, an average pore size of 4.0 nm, and a thickness of the shell layer of 2.0 μm.

Example 8 Preparation of Catalyst I

The catalyst I comprises: an inorganic silica gel as a carrier, cobalt as an active component, zirconium as a promoter, a shell layer comprising a mesoporous material, and a hydrophobic organic compound layer of γ-aminopropyltriethoxysilane. A content of zirconium is 10 wt. %, and a content of cobalt is 10 wt. %.

Preparation of the catalyst I is as follows:

1) 30 g of the inorganic silica gel carrier having a specific area of 300 $m^2/g$, a pore volume of 0.75 mL/g, an average pore size of 13 nm, and a particle size of 150 μm was soaked in 45 mL of an aqueous solution comprising 9.5 g of zirconyl nitrate to yield a first mixture. The first mixture was then aged in air for 12 hrs, dried at 70° C. for 24 hrs, and calcined in a muffle furnace at 400° C. for 12 hrs to yield a zirconium-loaded inorganic silica gel carrier.

2) The zirconium-loaded inorganic silica gel carrier was soaked in 63 mL of an aqueous solution comprising 7.55 g of $CoCO_3$ to yield a second mixture. Thereafter, the second mixture was aged in air for 12 hrs, dried at 70° C. for 24 hrs, and calcined in the muffle furnace at 400° C. for 12 hrs to yield a primary cobalt-based catalyst for Fischer-Tropsch synthesis.

3) 4 g of a template agent P123 is dissolved into 140 mL of a nitric acid solution having a concentration of 2 mol/L to yield a third mixture. The third mixture was thereafter stirred at 25° C. until a clarified solution was yielded. 8.4 g of tetraethyl orthosilicate was added to the clarified solution and continued stirring for 30 hrs to yield a precursor solution of a mesoporous material.

4) The precursor solution of the mesoporous material was transferred to a clean teflon reactor. 10 g of the primary cobalt-based catalyst for Fischer-Tropsch synthesis was soaked in the precursor solution of the mesoporous material to yield a fourth mixture. The fourth mixture was then fixed in a device for hydrothermal synthesis, crystalized at 80° C. for 70 hrs at a rotational speed of 15 rpm. The fourth mixture was then washed by distilled water to be neutral, dried at 120° C. for 10 hrs, and calcined at 500° C. for 8 hrs to yield a mesoporous material-coated cobalt-based catalyst for Fischer-Tropsch synthesis.

5) The mesoporous material-coated cobalt-based catalyst for Fischer-Tropsch synthesis was soaked in 200 mL of a γ-aminopropyltriethoxysilane solution, and sealed for 15 hrs. A resulting fifth mixture was then rinsed by acetone for 2 times, dried at 90° C. for 5 hrs to yield the catalyst I, i.e., a mesoporous material-coated cobalt-based catalyst possessing hydrophobic property.

It was found from detection that the catalyst I has a specific area of 350 $m^2/g$, a pore volume of 0.6 mL/g, an average pore size of 9 nm, and a thickness of the shell layer of 6 μm.

Comparative Example 1 Conventional Catalyst A

The conventional catalyst A comprises: an inorganic silica gel as a carrier, cobalt as an active component, and zirconium as a promoter. A content of zirconium is 5 wt. %, and a content of cobalt is 20 wt. %.

Preparation of the catalyst A is as follows:

1) 30 g of the inorganic silica gel carrier having a specific area of 280 m²/g, a pore volume of 1.25 mL/g, an average pore size of 13.6 nm, and a particle size of 40 μm was soaked in 45 mL of an aqueous solution comprising 5.07 g of $ZrO(NO_3)_2$ to yield a first mixture. The first mixture was then aged in air for 16 hrs, dried at 110° C. for 8 hrs, and calcined in a muffle furnace at 450° C. for 10 hrs to yield a zirconium-loaded inorganic silica gel carrier.

2) The zirconium-loaded inorganic silica gel carrier was soaked in 63 mL of an aqueous solution comprising 39.43 g of $Co(NO_3)_3.6H_2O$ to yield a second mixture. Thereafter, the second mixture was aged in air for 16 hrs, dried at 110° C. for 8 hrs, and calcined in the muffle furnace at 450° C. for 10 hrs to yield a cobalt-based catalyst A for Fischer-Tropsch synthesis.

Evaluation results of the synthesis of the liquid hydrocarbon using biomass respectively in the presence of the catalysts B-I and the conventional catalyst A are compared in Table 1.

It is known from Table 1 that when the conventional catalyst is coated with a shell layer comprising the mesoporous material, the conversion of CO is not visibly changes and approximately between 55 and 65 wt. %. This is primarily because that although the shell layer comprising the mesoporous material has a certain thickness, the particle size of the catalyst is relatively small, the mass transfer resistance is also relatively small, and the shell layer comprising the mesoporous material provides mass transfer channels for $H_2$ and CO. While the selectivity of the liquid hydrocarbon is slightly improved and the selectivity of methane is slightly decreased, which may be because that the shell layer comprising the mesoporous material is capable of preventing the active component from shedding as a result of friction in the process of activation and transfer. In addition, the shell layer comprising the mesoporous material is capable of stopping water of the bulk from directly contacting the active center. After hydrophobic organic modification of the surface of the shell layer, the selectivity of the liquid hydrocarbon increases, and the selectivity of the methane is obviously decreased, which indicates that the introduction of the hydrophobic substance into the shell layer comprising the mesoporous material is capable of effectively preventing the catalyst from being oxidized by water and deactivated. Once the small molecule water is produced, it is blown out of the shell layer along with the hydrophobic organic compound layer. Thus, the Cobalt-based catalyst prepared in the invention has relatively high reactivity, high selectivity of liquid hydrocarbon ($C_{5+}$), and low selectivity of methane.

Particularly after the introduction of the hydrophobic substance into the shell layer comprising the mesoporous material, the selectivity of the liquid hydrocarbon is much greatly improved. Because the molecular structure of the organic compound in the modified catalyst F is relatively smaller, the hydrophobicity of the modified catalyst F is relatively poor than those of the catalysts E and G. The price of the organic compound in the modified catalyst E is higher than the modified catalyst G, and has easy volatilization and strong corrosivity. The catalyst H has relatively small specific area and pore size, and the activity thereof and the selectivity of the hydrocarbon are slightly reduced. The catalyst I has relatively large particle size and thick shell layer, a certain mass transfer resistance, and reduced conversion of CO, but the crystallization time of the catalyst I is relatively long. Based on the above ground, the catalyst G is superior than the catalysts E, F, H, and I.

TABLE 1

Comparison of activities and selectivity of catalysts A-I

| Catalyst | $X_{CO}$/% | S ($CH_4$)/% | S ($C_2$-$C_4$) % | S ($C_5^+$)/% | S ($CO_2$)/% |
|---|---|---|---|---|---|
| A | 60.3 | 14.5 | 7.1 | 76.9 | 1.5 |
| B | 61.0 | 10.6 | 7.1 | 81.1 | 1.2 |
| C | 60.5 | 10.2 | 7.5 | 81.0 | 1.3 |
| D | 60.0 | 10.7 | 7.0 | 80.9 | 1.4 |
| E | 62.4 | 5.5 | 6.3 | 87.2 | 1.0 |
| F | 63.1 | 9.2 | 6.9 | 82.9 | 1.0 |
| G | 64.5 | 5.2 | 6.3 | 87.5 | 0.9 |
| H | 60.0 | 7.6 | 7.1 | 84.3 | 1.0 |
| I | 55.3 | 7.8 | 7.5 | 83.8 | 0.9 |

For better explaining the advantage of the invention, long-term stabilities of the conventional catalyst A and the catalysts B and G of certain embodiments of the present disclosure are studied, the results of which are listed in Table 2 and 3.

TABLE 2

Comparison of conversions of CO among catalysts after long-term operation

| Catalyst | t = 500 h | t = 800 h | t = 1000 h | t = 1500 h | t = 2000 h | t = 2500 h |
|---|---|---|---|---|---|---|
| A | 60.3% | 58.6% | 50.4% | 40.3% | 31.8% | 25.8% |
| B | 61.0% | 60.9% | 59.9% | 56.9% | 50.2% | 40.1% |
| G | 64.5% | 64.4% | 64.3% | 63.9% | 62.2% | 60.1% |

TABLE 3

Comparison of selectivity of liquid hydrocarbon ($C_5$+) among catalysts after long-term operation

| Catalyst | t = 500 h | t = 800 h | t = 1000 h | t = 1500 h | t = 2000 h | t = 2500 h |
|---|---|---|---|---|---|---|
| A | 76.9% | 76.8% | 71.3% | 63.5% | 58.1% | 53.5% |
| B | 81.0% | 81.1% | 79.5% | 76.4% | 70.6% | 67.8% |
| G | 87.4% | 87.5% | 87.5% | 86.5% | 85.9% | 84.9% |

It is known from Tables 2 and 3 that when the reaction time of the conventional catalyst A in the absence of any modification reaches 800 hrs, the activity of the conventional catalyst A begins to decrease, which may because cobalt on the surface of the catalyst is shed off under the action of friction after long-term stirring, and water produced from the reaction make the catalyst oxidized and deactivated. When the conventional catalyst is coated with the shell layer comprising the mesoporous material to yield the catalysts B and G, the reaction time is prolonged to 1500 hrs and the conversion of CO still remains 55% above. This is probably because the shell layer of the catalyst is able to protect the active center of the catalyst and prevent the metal part of the catalyst from being shed off under the friction. Particularly for the catalyst G modified by the hydrophobic organic substances, when the reaction operates for 2500 hrs, the activity of the catalyst is still high, and the conversion of CO still remains approximately 60%, and the selectivity of the liquid hydrocarbon is approximately 85%, which indicates that the service life of the catalyst is obviously prolonged. This is because the introduction of the hydrophobic group into the shell layer comprising the mesoporous material is able to effective prevent the metal part from being shed off the catalyst, and effectively prevent water from contacting with the active center, which may otherwise make the catalyst deactivated. In summary, the cobalt-based catalyst prepared in the invention has great stability and effectively prolonged service life.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A catalyst, comprising:
   elemental cobalt;
   a carrier, the carrier comprising silica; and
   a selective promoter, the selective promoter comprising zirconium; wherein:
   the elemental cobalt and the selective promoter are disposed on a surface of the carrier;
   outer surfaces of the elemental cobalt and the selective promoter are coated with a shell layer comprising a mesoporous material; and
   a hydrophobic organic compound is disposed on an exterior surface of the shell layer.

2. The catalyst of claim 1, wherein the carrier is an inorganic silica gel.

3. The catalyst of claim 2, wherein the inorganic silica gel has a specific area of between 150 and 350 $m^2/g$, an average pore size of between 3 and 50 nm, a pore volume of between 0.7 and 1.7 mL/g, and a particle size of between 20 and 200 μm.

4. The catalyst of claim 3, wherein the specific area of the inorganic silica gel is between 200 and 300 $m^2/g$, the average pore size of the inorganic silica gel is between 8 and 13 nm, the pore volume of the inorganic silica gel is between 0.75 and 1.3 mL/g, and the particle size of the inorganic silica gel is between 40 and 150 μm.

5. The catalyst of claim 1, wherein a content of the elemental cobalt accounts for between 10 and 25 wt. % of a total weight of the catalyst; and a content of the selective promoter accounts for between 5 and 10 wt. % of the total weight of the catalyst.

6. The catalyst of claim 5, wherein the content of the elemental cobalt accounts for between 15 and 20 wt. % of the total weight of the catalyst; and the content of the selective promoter accounts for between 5 and 8 wt. % of the total weight of the catalyst.

7. The catalyst of claim 5, wherein the content of the elemental cobalt accounts for between 20 and 25 wt. % of the total weight of the catalyst; and the content of the selective promoter accounts for between 8 and 10 wt. % of the total weight of the catalyst.

8. The catalyst of claim 1, wherein a thickness of the shell layer comprising the mesoporous material is between 1.8 and 13 μm.

9. The catalyst of claim 8, wherein the thickness of the shell layer comprising the mesoporous material is between 2.0 and 6.0 μm.

10. The catalyst of claim 1, wherein the catalyst has a specific area of between 150 and 400 $m^2/g$, an average pore size of between 2 and 40 nm, and a pore volume of between 0.5 and 1.4 mL/g.

11. The catalyst of claim 10, wherein the catalyst has the specific area of between 250 and 350 $m^2/g$, the average pore size of between 3 and 9 nm, and the pore volume of between 0.6 and 1.0 mL/g.

12. The catalyst of claim 1, wherein the hydrophobic organic compound is selected from polymethyltriethoxysilane, γ-aminopropyltriethoxysilane, and trimethylchlorosilane.

13. The catalyst of claim 1, wherein the hydrophobic organic compound protects the elemental cobalt from being oxidized by water.

14. The catalyst of claim 1, wherein when the catalyst is used in a Fischer-Tropsch synthesis process,
   the Fischer-Tropsch synthesis process yields a carbon-containing mixture comprising $C_{5+}$ hydrocarbons and $CH_4$;
   the hydrophobic organic compound shields the elemental cobalt from water that is produced during the Fischer-Tropsch synthesis process;
   a content of the $C_{5+}$ hydrocarbons accounts for between 82.9 and 87.5 wt. % of the total weight of the carbon-containing mixture; and
   a content of the $CH_4$ accounts for between 5.2 and 9.2 wt. % of the total weight of the carbon-containing mixture.

* * * * *